March 1, 1927.
C. EICHHORN
TRAIN PIPE COUPLING
Filed Oct. 27, 1922
1,619,464
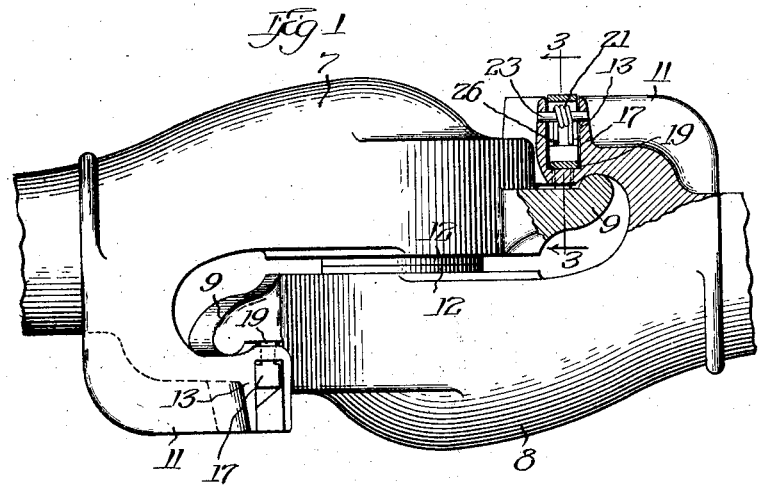
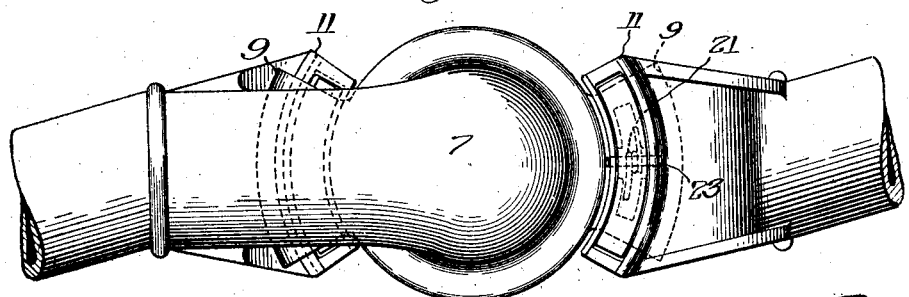
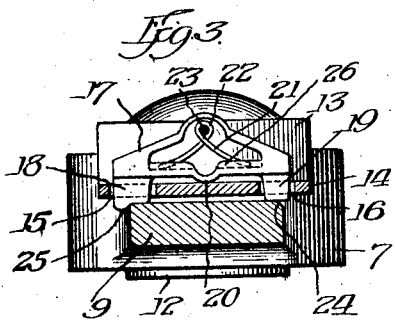
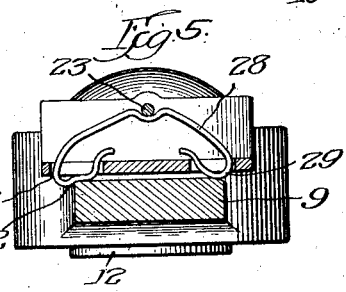
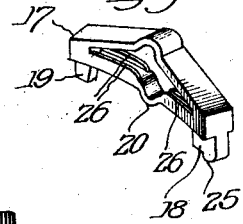
Witness:
Inventor
CHARLES EICHHORN Patented Mar. 1, 1927.

1,619,464

UNITED STATES PATENT OFFICE.

CHARLES EICHHORN, OF CHICAGO, ILLINOIS, ASSIGNOR TO VICTOR TOBOLLA, OF CHICAGO, ILLINOIS.

TRAIN-PIPE COUPLING.

Application filed October 27, 1922. Serial No. 597,249.

This invention pertains to a coupling adapted for use in connecting train pipes, such as air hose, steam lines, and the like, and has more particular reference to provisions for holding the coupling heads in snug fitting relation, and for preventing accidental uncoupling of the heads.

Train pipe couplings of this general character comprise companion heads, each provided with coupling lugs, the lugs of one head being adapted to cooperatively engage with the corresponding lugs on the other head upon rotary relative coupling movement of the heads. These lugs, however, vary somewhat in dimensions as the result of inaccuracy in manufacture, as do also the gaskets with which the heads are equipped, and which are employed to seal the joint between the coupled heads. Furthermore, the lugs and gaskets become worn by prolonged usage, with the result that leakage of the fluid under pressure in the train lines frequently occurs at the coupling joints.

One of the primary purposes of my present invention is to provide means whereby the coupling heads will be continuously urged together so as to tightly compress the gaskets and effectually seal the joint, irrespective of wear and irregularities in the coupling lugs and gaskets.

In use, the standard couplings now employed frequently work loose as the result of the train movement, and not infrequently become entirely uncoupled, particularly in cold weather when the train pipe hose is stiff.

Another object of this invention is to insure against uncoupling or even partial uncoupling which will result in leakage, by providing means for locking the coupling heads in interlocking relation so that they cannot become accidentally uncoupled.

Further objects and advantages of this invention should be readily appreciated from the following description when considered in connection with the accompanying drawings, upon which those embodiments of my invention which at present appear preferable, are illustrated.

Referring to the drawings:

Fig. 1 is a side elevation of a coupling embodying my invention;

Fig. 2 is a plan view thereof;

Fig. 3 is a sectional view on the line 3—3 of Fig. 1;

Fig. 4 is a detail perspective view of the holding and locking member shown in Figs. 1 to 3, inclusive;

Fig. 5 is a view similar to Fig. 3, showing another form of the invention.

Referring now to the drawings more in detail, reference characters 7 and 8 indicate generally a pair of mating coupling heads, each provided with an inner coupling lug 9 and an outer coupling lug 11, adapted to cooperatively engage with the opposed lug 9 of the companion head upon relative rotary coupling movements of the heads, as is customary in couplings of this character. The heads are provided with gaskets 12, usually made of rubber or other compressible material, arranged in opposed relation and adapted to be compressed to provide a sealed joint between the heads when said heads are coupled together.

As previously mentioned, these gaskets may differ in dimensions so that the joint is not perfectly sealed, even when the gaskets are new, and furthermore, after use the gaskets become worn and lose their resiliency so that leakage often results. The coupling lugs also differ in dimensions even on new heads, and when the lugs become worn, they fit together loosely. All these factors contribute toward leakage of the fluid under pressure at the coupling joints, and it is with a view of preventing such leakage that my present invention was designed.

In accordance with my invention, therefore, the outer lug 11 is provided with a transversely extending groove 13, open at the top and formed in an arc concentric with the axis of rotation of the heads. Near each end the bottom wall 14 of this groove is provided with apertures 15 and 16, respectively. Within the groove there is loosely positioned a locking member 17 provided with lugs 18 and 19, which extend downwardly through the apertures 15 and 16, respectively, into the path of movement of the coupling lug 9 of the companion head. These lugs are normally urged downwardly into engagement with the coupling lug 9 by a spring 21, shown in Figs. 1 to 3, inclusive, as a coiled spring provided centrally with an eye 22 adapted to receive and pivot about a pin 23, which extends transversely through the groove 13 above the spring.

It will be apparent that the locking member 17 is yieldingly held in position, and upon initial coupling movement of the heads, the inclined forward edge 24 of the coupling lug 9 will engage the locking lug 18, thereby rocking the member 17 upon the bearing boss 20 so as to permit the lug 9 to pass freely therebeneath and without interference by the lug 18. As the completion of the coupling movement of the coupling heads is approached, the forward edge of the lug 9 will engage the lug 19, thereby tending to tilt the member 17 in the opposite direction, and also imposing an additional tension upon the spring 21. When the coupling movement of the heads is completed, an extension or shoulder 25 on the lower face of the lug 18 will snap downwardly behind the lug 9 to thereby lock this lug against uncoupling movement. The heads will be, therefore, yieldingly locked against uncoupling movement, so that accidental uncoupling as the result of train movements is precluded.

In addition to holding the coupling heads against accidental uncoupling, the mechanism described performs the additional function of pressing the heads together so as to insure a tight seal between the gaskets 12, and preclude liability of leakage, which ordinarily results either from defective or worn gaskets or coupling lugs, or both. The heads may be manually uncoupled in the usual manner since a slight twist of the heads will release the lug 9 from the locking shoulder 25.

The member 17, as will be apparent from Fig. 4, is hollow to accommodate the spring therein, and cover the same. Guide ribs 26 are disposed in spaced relation upon the bottom wall to receive the ends of the spring between them, and to hold said ends against lateral displacement. A spiral spring, a leaf spring, or other desired type may be employed if preferred.

My invention also contemplates an integrally constructed locking member and spring, as illustrated in Fig. 5, wherein a leaf spring 28 is so shaped as to form the pressure lugs 29 and 31, the latter of which is shaped to provide the locking shoulder 32.

It should be apparent from the foregoing that I have provided a coupling in which the heads will be continuously and yieldingly pressed toward each other to insure against leakage, and in which the heads are by the same mechanism locked together against accidental uncoupling.

While both heads of the coupling should preferably embody my invention, it will be obvious that a head equipped with my invention may be coupled with a standard head not so equipped, in which case both functions of my invention; that is, the pressing of the heads together and the locking against uncoupling movement, will be performed by the head so equipped; but, of course, to a lesser degree.

The structural details of the invention may obviously be varied within wide limits without exceeding the scope of the invention as defined in the following claims.

I claim:

1. A train pipe coupling head comprising a body provided with inner and outer coupling lugs, and means comprising a pair of lugs yieldingly carried by said outer coupling lug in position to be engaged by the inner coupling lug of a companion head whereby said heads may be locked and pressed together.

2. A train pipe coupling head comprising a body provided with an outer coupling lug, and a member yieldably and tiltably carried by said lug and provided with a pair of projections extending beyond the lug engaging face of said lug, one of said projections having a shoulder for engaging a companion head.

3. A train pipe coupling head comprising a body provided with an outer coupling lug, said lug being provided with a transverse groove and a pair of apertures in the bottom wall thereof, and means mounted in said groove comprising a pair of projections extending through said apertures, one of said projections being provided with a locking shoulder, for engaging a companion head.

4. A train pipe coupling head comprising a body provided with a coupling lug, having a transversely disposed groove therein, the bottom wall of which is provided with a pair of apertures, a locking member loosely disposed in said groove and having a pair of projections extending through said apertures respectively, a pivot pin extending through said locking member, and a spring engaging said pin and said member for yieldingly urging said projections through said apertures into the path of travel of a locking lug on a companion head.

5. A train pipe coupling head comprising a body provided with a coupling lug, a locking member pivotally and yieldably carried by said lug and comprising a pair of spaced projections extending through the lug into the path of a coupling lug on a companion head, said locking member being adapted to be tilted in one direction upon engagement of said companion coupling lug with one of said projections and to be tilted in the opposite direction upon engagement of said lug with the other of said projections, the first of said projections being provided with a locking shoulder to hold said coupling lug against unlocking movement, and a spring for causing said locking member to exert a pressure upon said companion coupling lug.

6. A train pipe coupling head comprising, a body provided with a coupling lug, a hollow locking member mounted on said lug and provided with projections extending through said lug, a pin extending through said member, and a coil spring mounted on said pin and engaging said member, said member being provided with guiding means for preventing displacement of the ends of said spring.

7. In a train pipe coupling head having a body provided with inner and outer coupling lugs, a member mounted within one of said lugs and having spaced projections protruding through openings provided on the inner side of said lug, and means for pivotally and resiliently securing said member within said lug, said member being adapted to rock within said lug when one of said projections is engaged by a lug on a companion head during coupling of the heads together, whereby said heads will be frictionally secured together when interengaged.

8. In a train coupling head provided with an outer coupling lug and recess within said lug having spaced openings, means within said recess providing projections extending outwardly through said openings and means arranged with the first said means whereby said first said means may be rocked in said recess when its coupling head is being engaged with a companion head.

CHARLES EICHHORN.